Nov. 17, 1970    E. L. WASHBURN    3,541,587
COMPOSITION FOR PRODUCING MOLDED HIGH SUGAR
CONTAINERS FOR FROZEN COMESTIBLES
Filed May 23, 1968

Inventor:
Ernest L. Washburn
By Bair, Freeman & Molinare
Attys.

United States Patent Office 3,541,587
Patented Nov. 17, 1970

3,541,587
COMPOSITION FOR PRODUCING MOLDED HIGH SUGAR CONTAINERS FOR FROZEN COMESTIBLES
Ernest L. Washburn, Mundelein, Ill., assignor to Keebler Company, a corporation of Delaware
Filed May 23, 1968, Ser. No. 731,430
Int. Cl. A21d 13/08
U.S. Cl. 99—88                                    11 Claims

ABSTRACT OF THE DISCLOSURE

A composition of dough for "sugar" cones. Starch having a high amylose content is included in dough formulated for making ice cream cones having 25 to 35% by weight sugar in the final cone product. The high amylose starch permits molding of "sugar" cones thereby avoiding expensive rolling and forming operations heretofore commonly utilized to make such cones.

BACKGROUND OF THE INVENTION

This invention relates to a composition for a dough useful in the preparation of containers, especially molded containers, for edible comestibles such as ice cream, candy and the like.

The ice cream cone has become an American tradition. As well known to any connoisseur of the ice cream cone, there are generally two types of edible containers or cones into which the ice cream may be placed. The first type may be described as a cone having low content of sugar. The sugar content of the final baked cone in this case is normally about 6 or 7% by weight. The dough from which low sugar content cones are made is most easily formed and baked into a cone shape in a mold. The use of a mold for making cones is desirable since production output is high and cost is low relative to other methods.

The second type of cone is known as the "sugar" cone. A sugar cone has a sugar content in the final baked cone of about 27 or 28% by weight sugar. This second type of cone has become extremely popular in recent years because it is much more palatable in relation to the low sugar content cones. However, sugar cones cannot be baked in a mold because the dough tends to stick to the mold, making it extremely difficult to remove the baked cones from the mold. Distortion, sticking and carbonizing develop in high sugar content cones during baking to cause the unsatisfactory release characteristics of the cones from a mold. Thus, although preferred by the consumer, the sugar cones are more expensive to make.

Nevertheless, because they are preferred, sugar cones are made without molds. The dough is mixed, flowed into a flat state and baked. It is then rolled into a cone shape while it is still warm and pliable. This method also results in problems and disadvantages almost as serious as those encountered when attempting to mold sugar cones. For example, if the dough is not properly rolled, the sizes or shapes of cones will not be uniform. Also, by forming the cones from the baked batter and rolling it or shaping it into a suitable cone shape, holes can easily develop at the apex of the cone. This results in a high rejection rate of shaped sugar cones (from 10 to 30%). In addition, the cones are made by a process which is time consuming, uneconomical and not competitive with the rate of production possible in molding.

Not only does the batter composition or dough for sugar cones have the discussed disadvantages, but also the amount of sugar in the final sugar cone product is limited to about 29% by weight. A composition with a higher sugar content will stick to the flat plate during baking, making the cooked dough almost impossible to handle.

The present invention presents a solution which substantially overcomes all of the disadvantages previously encountered in the manufacturing of sugar cones.

SUMMARY OF THE INVENTION

In a principal aspect the present invention of a composition for the manufacture of containers for frozen comestibles comprises a batter of water, shortening, flour, sugar in an amount that the final baked product includes at least about 15% by weight sugar, and a high amylose starch in an amount that the final baked product includes at least about 0.5% by weight amylose. A high amylose starch is a starch including more than about 50% by weight amylose. Such a starch prevents sticking of the composition to a mold when the composition is baked.

Therefore it is an object of the present invention to provide an improved composition or dough for making relatively high sugar content ice cream cones.

It is a further object of the present invention to provide an easily formulated and economical dough which avoids the disadvantages which have severely limited the economical production of "sugar" cones.

Another object is to formulate an ice cream cone dough which may be baked in molds to produce ice cream cones having a sugar content of about 27–28% by weight.

These and other objects, advantages and features will be more fully set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
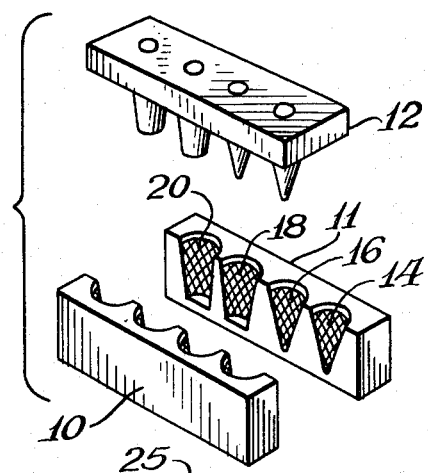
FIG. 1 is a perspective view of a typical mold utilized with the invention.

A typical, conventional "sugar" cone dough includes by weight about two hundred parts of midwest soft wheat flour; eighty parts of brown granulated sugar; one to two parts protein (e.g. ZEIN sold by Corn Products Co.); two parts lecithin; four parts shortening: salt, flavoring, coloring and soda to suit, and two hundred parts water. These ingredients are combined and kneaded for about 2 to 5 minutes. The resulting dough is flowable. Substantially equal portions are flowed on a flat baking surface. The dough is baked between double patterned plates in the same manner as a waffle in a waffle iron at about 350° F. for approximately two minutes. Then the soft, patterned, pliable flat pieces of baked dough are rolled into a cone shape before they cool and harden. The final baked cone is comprised of about 27 to 28% by weight sugar.

The present invention provides a formulation with which it is possible to mold edible containers, such as ice cream cones, having a finished product weight percentage of sugar of more than about 15%. The critical and important feature of the present invention is the inclusion of a high amylose content starch in the dough. This special starch is utilized in combination with other ingredients commonly utilized in a typical sugar cone batter.

Starches are a combination of the two components, amylose and amylopectin. The physical and chemical properties of these components vary considerably (see, Chemistry of Organic Compounds, Noller (1951) p. 385 et seq.). Moreover, starches derived from different plants or different varieties of the same plant differ greatly in composition. For example, corn starch generally includes 28 to 29% amylose, tapioca starch about 20% and waxy maize or sorghum none.

Recently, however, high amylose content starches (those having about 50% or more amylose) have been obtained from corn hybrids (see, "High Amylose Cornstarch—Properties and Prospects," Senti and Russell, TAPPI, v. 43, No. 4, p. 343, April 1960) and peas (see, "The structure of a New Starch of High Amylose Content," Wolff et al., Jour. of Am. Chem. Soc., v. 77, p. 1654, Mar. 20, 1955). Such starches are of the type utilized in the present invention.

Of course, the list and quantity of ingredients in a sugar cone batter may vary somewhat from the recipe given above depending upon the amount of sugar to be included in the final product and the texture and flavor desired in the cone. Generally, however, the above recipe is a typical standard formulation.

In the formulation of the invention, a high amylose starch (about 50% or more amylose) is included in a dough which provides a final baked product having about 15% or more by weight sugar content. High amylose starch is required in an amount that provides at least about 0.5% by weight amylose in the final baked cone product. The preferable range of sugar in a sugar cone is 20–30% by weight of the final cone. Preferably at least about 0.75% by weight of a sugar cone of this composition, as contemplated by the invention, is amylose. Thus with a 50% by weight amylose starch at least about 1.5% by weight of the cone is starch (amylose plus amylopectin).

In practice the range of sugar content in a sugar cone is usually in the range of about 25–30% by weight. In this range a high amylose starch (starch having an amylose content of about 50–90%) is included in an amount in the sugar cone dough such that the final product comprises about 2–4% by weight starch. In a highly desired formulation, the final product includes about 27% by weight sugar and about 2.5% by weight of a starch having about 75% by weight amylose content. By utilizing such formulations described above, it has been found that the sugar cone batter may be molded rather than rolled as previously required. A further and highly surprising advantage of the formulation of the invention is the fact that the mold may have a uniform design pattern defined therein. This advantage is best understood by reference to the drawing.

As illustrated in FIG. 1, a cone mold normally consists of two segments 10 and 11, which fit together to form the female half of the mold, and a single male segment 12 forming the male half of the mold. The female segments 10 and 11 abut together along a parting line as shown at 22 in FIGS. 2 and 23 in FIG. 3 to define cone cavities 14, 16, 18 and 20. Each one of the female segments 10 and 11 defines one-half of the outside surface of a cone molded in the cavities 14, 16, 18 and 20. The mold in FIG. 1 is, for purposes of illustration, adapted to make both flat bottomed or cup and cone shaped cones. These shapes are known in the trade as the "cup" and the "cone" respectively and both shapes can be made from the composition of this invention in molds. Prior to this invention, of course, it was impossible to make cup shaped sugar cones since it was impossible to form a cup from the flat, baked sugar cone dough.

Molding is the most practicable way to make a cup, and sugar cone dough previously was difficult, if not impossible, to mold. Thus cavities 14 and 16 are shaped for baking flat-bottomed cones or "cups" and cavities 18 and 20 for baking cone shaped cones from the sugar cone dough of the invention.

The female mold half, made up of segments 10 and 11, is adapted to receive the male half of segment 12 of the mold which defines the interior surface of the baked cone. The male segment 12 provides a core so that a space is defined between the male and female parts of the mold. The cone dough flows in this space and is baked into a cone.

In practice the female segments 10 and 11 abut and batter is placed in the female half of the mold. The male mold half 12 is then inserted into the female half to force dough into the space between the mold halves and thereby shape the cone. The batter is then baked. After baking, the male segment is withdrawn and the halves of the female segment are separated along parting lines 22 or 23 to discharge the final cone.

Figure 2:
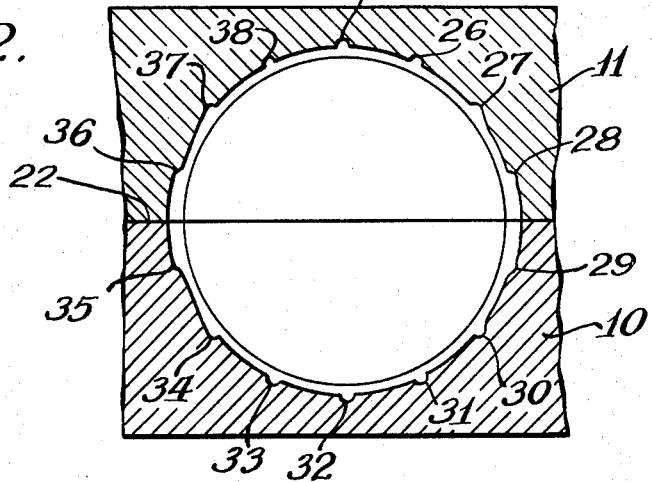
FIG. 2 is a cross sectional view of the female half of a mold illustrating the design pattern in the mold walls as utilized prior to this invention.

A pattern of grooves as shown in the cavities 14, 16, 18 and 20 in FIG. 1 is defined in the female mold surface to provide for decorative ridges in the final cone product. For example, the mold in FIG. 2 includes grooves 25 through 39 and the mold in FIG. 3 includes grooves 45 through 60. In the vicinity of the line of separation 22 between the segments 10 and 11 in FIG. 2, the mold grooves 27, 28, 29, 30, 34, 35, 36, 37 which define the decorative ridges in the baked cone, normally are poorly defined or missing. To include such grooves would result in abrasion or shearing of the ridges and perhaps breakage of the cones when separating the mold segments 10 and 11 in FIG. 2 to discharge the baked cone. This would come about because the ridges are baked into the grooves and the grooves would necessarily shear the ridges when the female mold segments 10 and 11 in FIG. 2 are parted.

Figure 3:
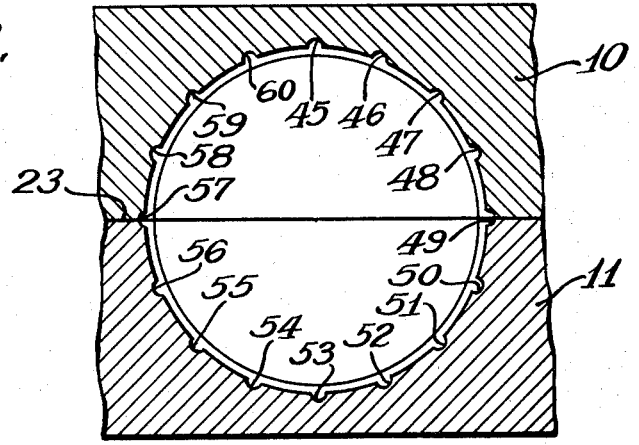
FIG. 3 is a cross sectional view of the female mold illustrating the design pattern in the mold walls as utilized with this invention.

However, with the improved composition of the present invention, a design of grooves may be uniformly defined completely around the female mold segments 10 and 11 in FIG. 3 as shown by grooves 45 through 65. This result is possible because the cooked product is resilient or rubbery. Thus the baked ridges on a sugar cone utilizing the present invention will elastically separate from the design pattern grooves or undercuttings on the mold walls since the cone "gives" as the mold segments 10 and 11 in FIG. 3 are separated.

The general formulation of the dough of the invention has been previously described. There are, however, numerous specific formulations which are acceptable and the following is an example of such a formulation.

EXAMPLE I

Mix two hundred grams of midwest soft wheat flour, seventy five grams of sugar, one gram of salt, flavoring and coloring, one to two grams of protein (for example, as sold under the trade name Zein by Corn Products Company), ten grams tapioca, four-tenths of a gram of monoglycerides (an emulsifier), one gram of lecithin, four grams shortening, two hundred grams of water, soda as desired for fluffiness and ten grams of high amylose starch (70% amylose, 30% amylopectin cornstarch sold under the trade name Amylomaize by American Maize Companyl). These ingredients are combined, well mixed and kneaded for 2 to 5 minutes. The critical addition is the final item; namely, the high amylose cornstarch. The batter is then placed in a mold and baked between 350 and 375 degrees Fahrenheit for about 2 minutes until done. The mold segments may then be separated to reveal the molded sugar cone container.

Table I below sets forth the ingredients for a number of samples utilizing the composition of the present invention.

TABLE I

| Parts of sugar per 200 parts flour | Parts of approx. 75% amylose starch | Parts of approx. 50% amylose starch | Percent by weight starch in final product | Percent by weight sugar in final product |
|---|---|---|---|---|
| 75 [1] | 5 | | | |
| 75 | 6 | | 2.0 | 27.3 |
| 75 | | [1] 6 | | |
| 75 | | 7½ | 2.5 | |
| 80 | 7½ | | 2.4 | 28.5 |
| 100 | 12½ | | 4.4 | 37.7 |
| 120 | 25 | | 6.7 | 35.7 |
| 130 | 40 | | | |
| 140 [2] | 40 | | | |
| 140 [3] | 60 | | | |
| 150 [4] | 60 | | | |

[1] The sugar cones of this formulation began to stick to the mold thus indicating the lower limit of 75% amylose starch which may be combined with the indicated ingredients to produce a molded sugar cone dough.
[2] This sample began sticking to the mold indicating that more high amylose starch was required for the particular composition of ingredients.
[3] This sample did not stick to the mold, but it is believed that less than 60 parts of corn starch would have produced successful results.
[4] This is about the maximum limit for the standard formulation of a batch of sugar cone dough. Extra binders to strengthen such high sugar containers are suggested such as additional tapioca or precooked wheat starches.

The compositions set forth in the prior table were all tested for molding. They all proved very acceptable except as noted in the footnotes to the table. The formulation of the batter (i.e., those ingredients not set forth in Table I) is typical and well known to those skilled in the art of cone manufacture as may be gathered by reference to Example I.

Numerous experiments were also run varying the percentage of sugar and the types of sweeteners. Besides using sugar as a sweetener, honey, corn syrup, dextrose, and brown sugar were used as sweetening agents. Results using these various sweeteners, illustrated in Table II below, can be summarized by saying that the high amylose starch produced equivalent results regardless of the sweetener used. The high amylose starch is the critical feature of the invention and the sweetening agent is not a limiting feature. As is known in the art, however, some sweetening agents result in more pliable and sticker products when cooked than sugar. In order to counteract this, greater amounts of high amylose starch are utilized as will be evident by a reference to Table II.

In the table reference to the components of the dough other than the flour, sweetening agent and starch have been omitted as these are well known in the art and are varied by various bakers according to individual taste.

TABLE II

| Sweetener | Parts/200 parts flour | Parts amylose 75% |
|---|---|---|
| Sugar | 67½ } | 17½ |
| Commercial honey | 10 } | |
| Sugar | 55 } | 30 |
| Commercial pure honey | 25 } | |
| Commercial honey | 95 } | 35 |
| Sugar | 50 } | 15 |
| Commercial brown sugar | 25 } | |
| Commercial brown sugar | 75 } | 20 |
| Sugar | 50 } | 25 |
| Corn syrup | 31 } | |
| Commercial corn syrup | 93 } | 35 |
| Sugar | 50 } | 20 |
| Dextrose | 25 } | |
| Dextrose | 90 | 30 |

This listing of alternative sweetening agents and combinations is merely illustrative and not limiting.

Thus, it can be seen that there are numerous equivalent compositions which will be obvious to those skilled in the baking art. Generally, more sticky or more tacky sweetening agents require higher percentages of amylose content in the final product to counteract stickiness. Thus when the percentage of sweetening agent, such as those listed above, is varied between 15 and 30% by weight of the final product, the percentage of amylose starch (containing 50% or more amylose) has been found to vary between about 2 and 40% by weight of the final product.

What is claimed is:

1. A dough composition useful for making molded baked containers for edible comestibles which does not stick to the baking mold, said composition comprising water, shortening, flour, an amount of sugar that provides at least about 15% by weight sugar in a final container and an amount of a starch having an amylose content of at least about 50% by weight so that said amylose content comprises at least about 0.5% by weight of the final container.

2. The composition of claim 1 wherein said amylose content comprises at least about 0.75% by weight of the final container.

3. The composition of claim 1 wherein said starch comprises at least about 1.5% by weight of the final container.

4. The composition of claim 1 wherein said sugar comprises about 25–30% by weight of the final container and said starch comprises about 2–4% by weight of the final container, said starch having about a 50–90% by weight amylose content.

5. The composition of claim 1 wherein said sugar comprises about 25% by weight of the final container and said starch comprises about 2.5% by weight of the final container, said starch having about a 75% by weight amylose content.

6. The composition of claim 1 wherein said dough comprises about two hundred parts water, about two hundred parts flour, about seventy-five parts sugar, about four parts shortening, about one-half part salt, flavoring, coloring, and condiments, and about ten parts of starch comprised of about 70% by weight amylose.

7. The composition of claim 1 wherein said sugar comprises about 35% by weight of the final container and said starch comprises about 4–7% by weight of the final container.

8. A dough composition useful for making molded baked containers for edible comestibles which does not stick to the baking mold, said composition comprising water, shortening, flour, an amount of natural sweetening agent that provides at least about 15% by weight sweetening agent in a final container and an amount of a starch having an amylose content of at least about 50% by weight so that said starch comprises at least 2% by weight of the final container.

9. The composition of claim 8 wherein said sweetening agent comprises about 15–30% by weight of said container and said starch comprises about 2–40% by weight of said container.

10. The composition of claim 8 wherein said sweetening agent is a mixture of sweeting agents.

11. The composition of claim 8 wherein said sweetening agent is selected from a group consisting of corn syrup, commercial honey, dextose and commercial brown sugar.

References Cited

UNITED STATES PATENTS 2,394,791  2/1946  LLoyd et al. _____ 99—89 XR
2,785,980  3/1957  Washburn _____ 99—89 XR RAYMOND N. JONES, Primary Examiner J. R. HOFFMAN, Assistant Examiner U.S. Cl. X.R.

99—89